United States Patent
Nakanishi

(10) Patent No.: US 6,950,843 B2
(45) Date of Patent: Sep. 27, 2005

(54) MULTI-DIMENSIONAL FOURIER TRANSFORM PARALLEL PROCESSING METHOD FOR SHARED MEMORY TYPE SCALAR PARALLEL COMPUTER

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 09/812,829

(22) Filed: Mar. 21, 2001

(65) Prior Publication Data

US 2002/0065862 A1 May 30, 2002

(30) Foreign Application Priority Data

Nov. 24, 2000 (JP) ...................................... 2000-358233

(51) Int. Cl.⁷ ............................................ G06F 17/14
(52) U.S. Cl. ...................................... 708/401; 708/403
(58) Field of Search .......................... 708/401, 403–405

(56) References Cited

U.S. PATENT DOCUMENTS

| 5,126,962 | A | * | 6/1992 | Chiang ........................ 708/401 |
| 5,751,616 | A | * | 5/1998 | Hegland et al. ............. 708/401 |
| 6,073,154 | A | * | 6/2000 | Dick ............................ 708/401 |
| 6,237,012 | B1 | * | 5/2001 | Ohgose ....................... 708/401 |
| 2000/0358233 | | | 3/2004 | Weaver |

FOREIGN PATENT DOCUMENTS

| JP | 2-085960 | 3/1990 |
| JP | 9-153029 | 6/1997 |

OTHER PUBLICATIONS

Notice of Rejection Grounds, U.S. Appl. No. 2000–358233 dated Mar. 24, 2004.

* cited by examiner

Primary Examiner—D. H. Malzahn
(74) Attorney, Agent, or Firm—Staas & Halsey LLP

(57) ABSTRACT

Three-dimensional data that is processed is divided by the number of threads in the third dimensional direction and stored to respective secondary cache memories of the threads. Each thread Fourier transforms data stored in the secondary cache in the first dimensional direction and the second dimensional direction. As a result, a two-dimensional Fourier transform can be performed in parallel at a time. The resultant data that has been two-dimensionally transformed is restored to a shared memory. Each thread Fourier transforms the data in the third dimensional direction.

6 Claims, 6 Drawing Sheets

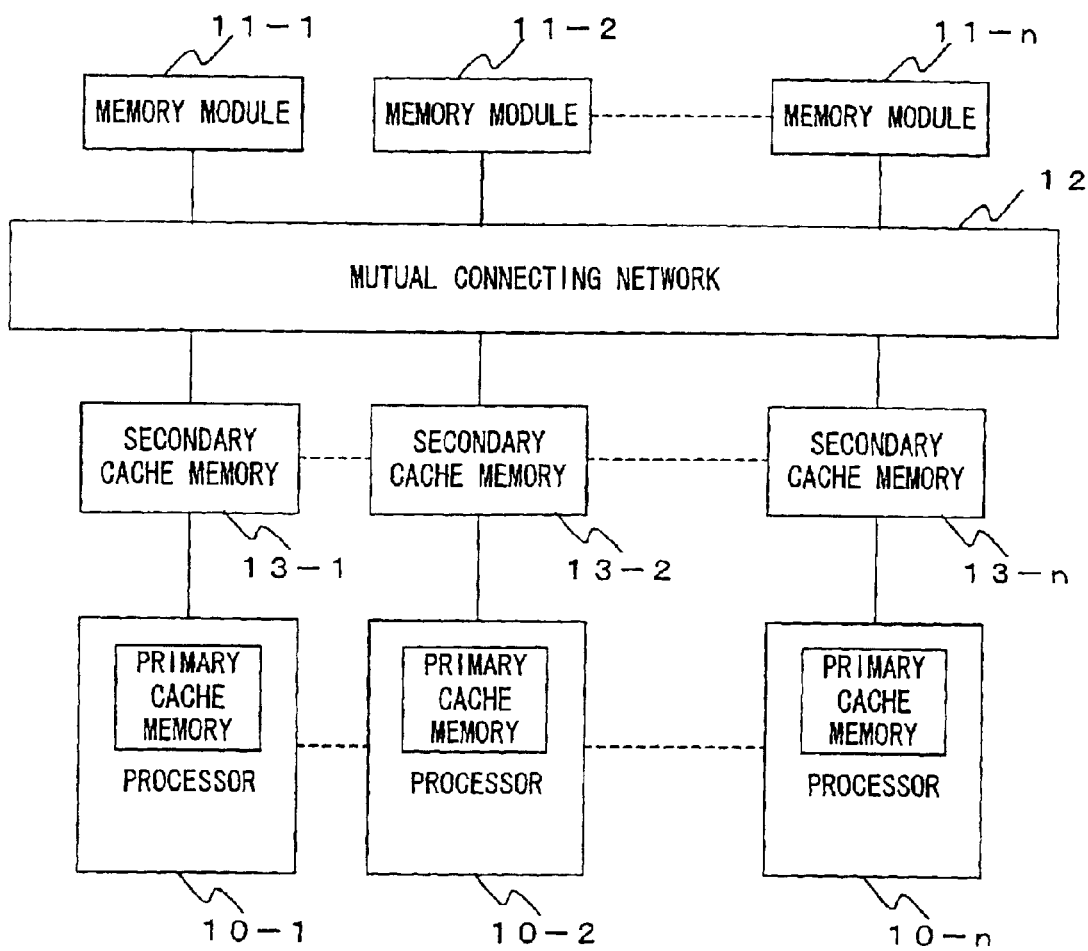
F I G. 1

MULTI-DIMENSIONAL FOURIER TRANSFORM PARALLEL PROCESSING METHOD FOR SHARED MEMORY TYPE SCALAR PARALLEL COMPUTER

BACKGROUND OF THE INVENTION

1. Field of the Invention

The present invention relates to a multi-dimensional Fourier transform parallel processing method for a shared memory type scalar parallel computer.

2. Description of the Related Art

A multi-dimensional Fourier transform for a vector computer has been developed so that the vector length becomes as long as possible. In particular, to perform a high-order Fourier transform such as three dimensional Fourier transform, an algorithm of which a vector length is represented by n1×n2 is used (where n1 and n2 are lengths of data of respective one-dimensional directions).

For fully using the function of a RISC scalar processor, it is important to store data in a cache and reuse the stored data. Thus, before the first dimensional data is Fourier transformed, it is transposed so that the first dimensional data becomes the third dimensional data. Thereafter, the transformed data is re-transposed.

A one-dimensional Fourier transform used in a three-dimensional Fourier transform is performed in such a manner that the vector length becomes long.

However, in a shared memory type scalar parallel computer, unless data stored in a primary cache memory and a secondary cache memory is effectively used and calculated, data is frequently exchanged between a shared memory and a processor. Thus, the resultant overhead becomes large.

SUMMARY OF THE INVENTION

An object of the present invention is to provide a multi-dimensional Fourier transform parallel processing method that effectively uses a cache memory.

An aspect of the present invention is a multi-dimensional Fourier parallel processing method for a shared memory type scalar parallel computer having a plurality of processors, the method comprising the steps of (a) dividing multi-dimensional data to be Fourier transformed into a plurality of two-dimensional data elements corresponding to the number of the processors and storing the divided two-dimensional data elements to secondary cache memories of the processors, (b) causing each of the processors to two-dimensionally Fourier transform the two-dimensional data elements stored in the relevant secondary cache memory, and (c) repeating the step (b) a required number of times and when necessary, assigning the remaining one-dimensional data elements to each of the processors and causing each of the processors to one-dimensionally Fourier transform the one-dimensional data elements.

According to the present invention, in the multi-dimensional Fourier transform, data stored in a secondary cache memory is effectively used and Fourier transformed. Thus, it is not necessary to frequently exchange data with the shared memory. As a result, the parallel process can be effectively performed.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a block diagram showing an example of the structure of a shared memory type scalar parallel computer;

DESCRIPTION OF PREFERRED EMBODIMENT

Figure 2:
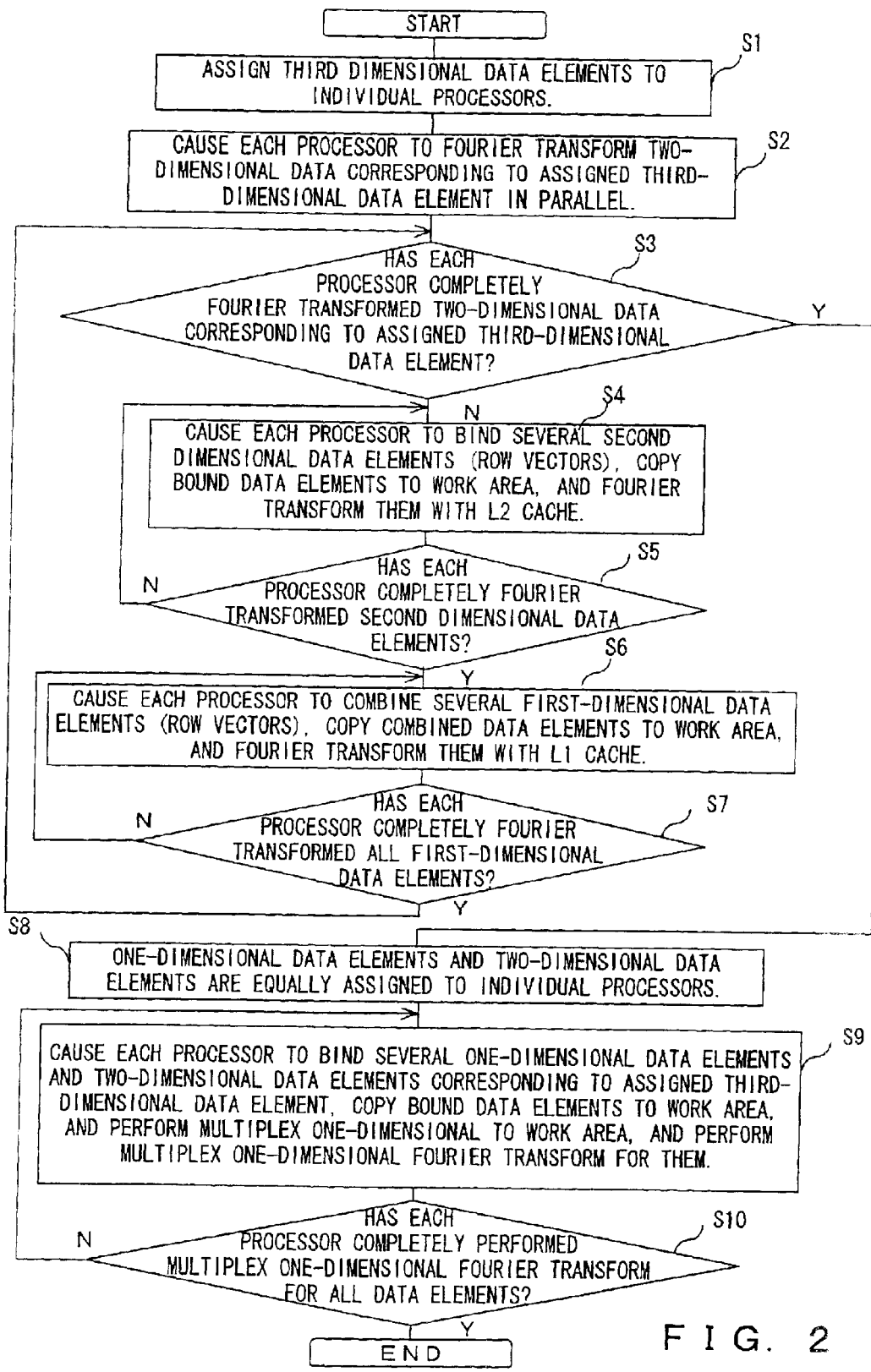
FIG. 2 is a flow chart showing a process of an embodiment of the present invention.

In an SMP machine, RISC scalar processors are connected with memories that are memory module, primary cache memories and secondary cache memories.

FIG. 1 is a block diagram showing an example of the hardware structure of a shared memory type scalar parallel computer.

In the shared memory type scalar parallel computer, a plurality of processors 10-1, 10-2, . . . , and 10-n are connected to a mutual connecting network 12 through secondary cache memories 13-1, 13-2, . . . , and 13-n, respectively. The processors 10-1, 10-2, . . . , and 10-n have respective primary cache memories. Alternatively, the primary cache memories are disposed between the secondary cache memories 13-1, 13-2, . . . , and 13-n and the processors 10-1, 10-2, . . . , and 10-n. Memory modules 11-1, 11-2, . . . , and 11-n are shared by the processors 10-1, 10-2, . . . , and 10-n through the mutual connecting network 12. In other words, the processors 10-1, 10-2, . . . , and 10-n can access the memory modules 11-1, 11-2, . . . , and 11-n through the mutual connecting network 12. When the processor (10-1, 10-2, . . . , 10-n) processes data, the processor reads data from a relevant memory module (11-1, 11-2, . . . , 11-n), writes it to a relevant secondary cache memory (13-1, 13-2, . . . , 13-n), and copies a predetermined unit of data from the relevant secondary cache memory to the primary cache memory. The processor processes the data with the primary cache memory.

After the processor has completed the process, the processor stores the processed data from relevant the primary cache memory to the relevant secondary cache memory. After the processor has completed the process for all the data stored in the secondary cache memory, the processor updates the relevant memory module (11-1, 11-2, . . . , 11-n) from which data is read before the process. When a particular processor (10-1, 10-2, . . . , 10-n) processes next data, each processor reads data which is processed by each processor from a particular memory module (11-1, 11-2, . . . , 11-n), writes it to a relevant secondary cache memory (13-1, 13-2, . . . , 13-n), and stores a predetermined unit of data to the relevant primary cache memory. The processor processes the data with the relevant primary cache memory. The processors 10-1, 10-2, . . . , and 10-n repeat such a process in parallel. In this case, when data processed by each processor is written to a memory module and then the data is read from the memory module for the next process, if each processor reads data at respective timing, the processor may read non-updated data rather than updated data. At that point, it is necessary to cause the processors to be restricted from reading data from the memory modules until all the processors completely update data of the memory modules. An operation for restricting processors from reading data from memory modules and synchronizing processes of all the processors is referred to as barrier synchronization.

According to the embodiment of the present invention, the parallel process is performed using an algorithm that follows.

The third dimensional data is equally divided. Each processor one-dimensionally and two-dimensionally Fourier transforms the divided third dimensional data. At that point, each processor two-dimensionally Fourier transforms two-dimensional data corresponding to each element of the third dimensional data. The processor Fourier transforms first dimensional data and second dimensional data as two-dimensional data effectively using an L2 cache (secondary cache memory). At that point, the processor binds one-dimensional data elements and copies the bound data elements to the work area. The processor Fourier transforms the bound data elements with the work area. As a result, the L1 cache (primary cache memory) is effectively used. In addition, successive data addresses of the work area are allocated so as to effectively transfer data from the L2 cache to the L1 cache. As a result, data elements are successively accessed.

Finally, third dimensional data is assigned to each processor. Each processor Fourier transforms the assigned third dimensional data. As a result, the parallel process is performed.

FIG. 2 is a flow chart showing the process of the embodiment of the present invention.

At step S1, third dimensional data elements are assigned to the individual processors. At step S2, each processor Fourier transforms two-dimensional data corresponding to the assigned third-dimensional data element. In this case, each processor Fourier transforms the two-dimensional data in the row direction. At that point, each processor binds several elements (for example, four elements) of the two-dimensional data in the row direction and copies the bound elements to a work array (primary cache memory). Each processor processes the bound elements with the work array.

At step S3, it is determined whether or not each processor has completely two-dimensionally Fourier transformed the assigned third-dimensional data element. When the determined result at step S3 is Yes, the flow advances to step S8. When the determined result at step S3 is No, the flow advances to step S4. From step S4, each processor binds several second-dimensional data elements (row vectors) and copies the bound data elements to the work area. Thereafter, each processor Fourier transforms the second-dimensional data elements with the L2 cache (secondary cache memory). At step S5, it is determined whether or not each processor has completely Fourier transforms the second-dimensional data elements. When the determined result at step S5 is No, the flow returns to step S4. At step S4, each processor repeats the transform process.

When the determined result at step S5 is Yes, the flow advances to step S6. At step S6, each processor binds several first-dimensional data elements (row vectors) and copies the bound data elements to the work area. Thereafter, each processor Fourier transforms the first-dimensional data elements with the L1 cache (primary cache memory).

At step S7, it is determined whether or not each processor has completely Fourier transformed the first-dimensional data elements. When the determined result at step S7 is No, the flow returns to step S6. From step S6, the processor repeats the transform process. When the determined result at step S7 is Yes, the flow returns to step S3.

When the determined result at step S3 is Yes, the flow advances to step S8. At step S8, one-dimensional data elements and two-dimensional data elements are equally assigned to the individual processors. At step S9, each processor binds several data elements of the one-dimensional data elements and two-dimensional data elements corresponding to the assigned third-dimensional data element and copies the bound data elements to the work area. Thereafter, each processor performs a multiplex one-dimensional Fourier transform for the bound elements with the work area. At step S10, it is determined whether or not each processor has completely performed the multiplex one-dimensional Fourier transform for all the data elements of the one-dimensional data elements and two-dimensional data elements corresponding to the assigned third-dimensional data element. When the determined result at step S10 is No, the flow returns to step S9. At step S9, each processor repeats the process. When the determined result at step S10 is Yes, the process is completed.

In the flow chart shown in FIG. 2, a three-dimensional Fourier transform is described. However, it should be noted that the present invention can be applied to other Fourier transforms (namely, higher than three-dimensional Fourier transform).

FIGS. 3 to 6 are schematic diagrams for explaining the operation of the embodiment of the present invention.

In these drawings, it is assumed that the three-dimensional Fourier transform is executed by four threads (processors). However, it should be understood by those skilled in the art that the same method can be applied to more threads and/or other dimensional Fourier transforms.

Figure 3:
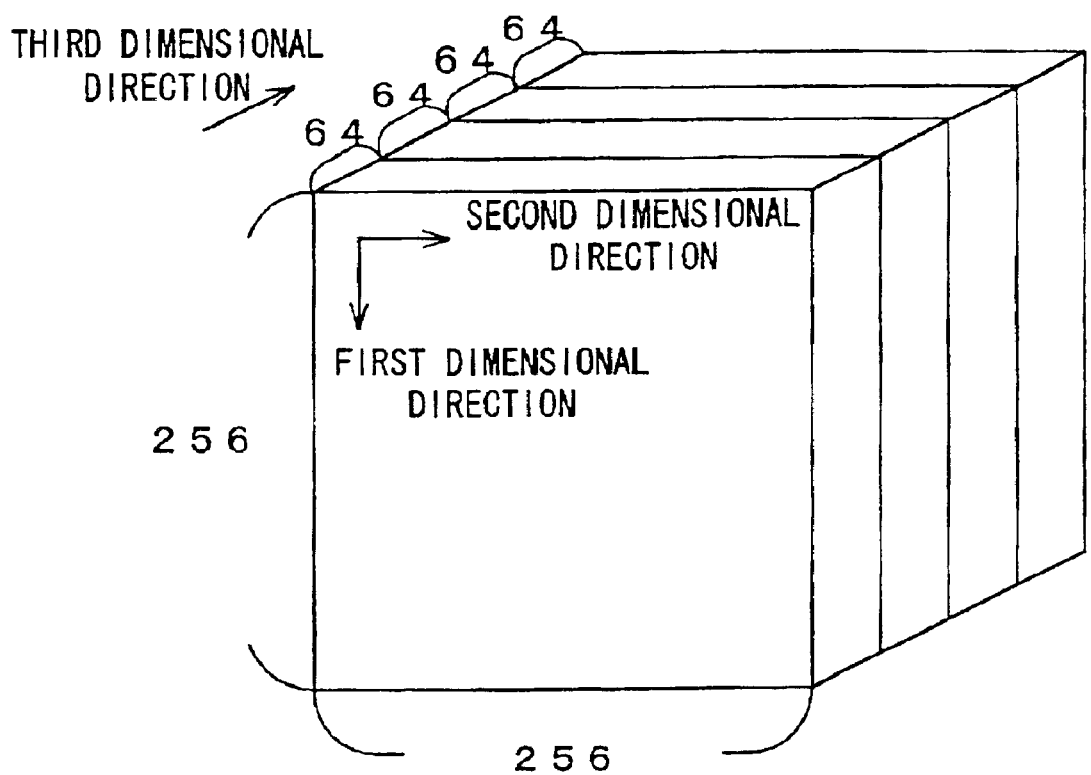
FIG. 3 is a schematic diagram for explaining the operation of the embodiment (No. 1)

As shown in FIG. 3, when complex three-dimensional data of 256×256×256 elements is Fourier transformed by four threads, the complex three-dimensional data is divided into four portions in the third dimensional direction. In this case, the third dimensional direction is divided into 64+64+64+64 elements. The divided data elements are stored to the following arrays (secondary cache memories).

Thread 1: C (1:256, 1:256, 1:64)

Thread 2: C (1:256, 1:256, 65:128)

Thread 3: C (1:256, 1:256, 129:192)

Thread 4: C (1:256, 1:256, 193:256)

In this example, "1:256" represents that a variable value whose index ranges from 1 to 256 is set to an array. In addition, in C (x, y, z), x, y, and z represent the first dimension, second dimension, and third dimension, respectively.

Each thread Fourier transforms the first and second dimensional data. The thread 1 performs Fourier transform for data elements 1 to 64 of the third dimensional data. First of all, the thread 1 Fourier transforms two-dimensional data corresponding to the data element 1 of the third dimensional data.

Figure 4:
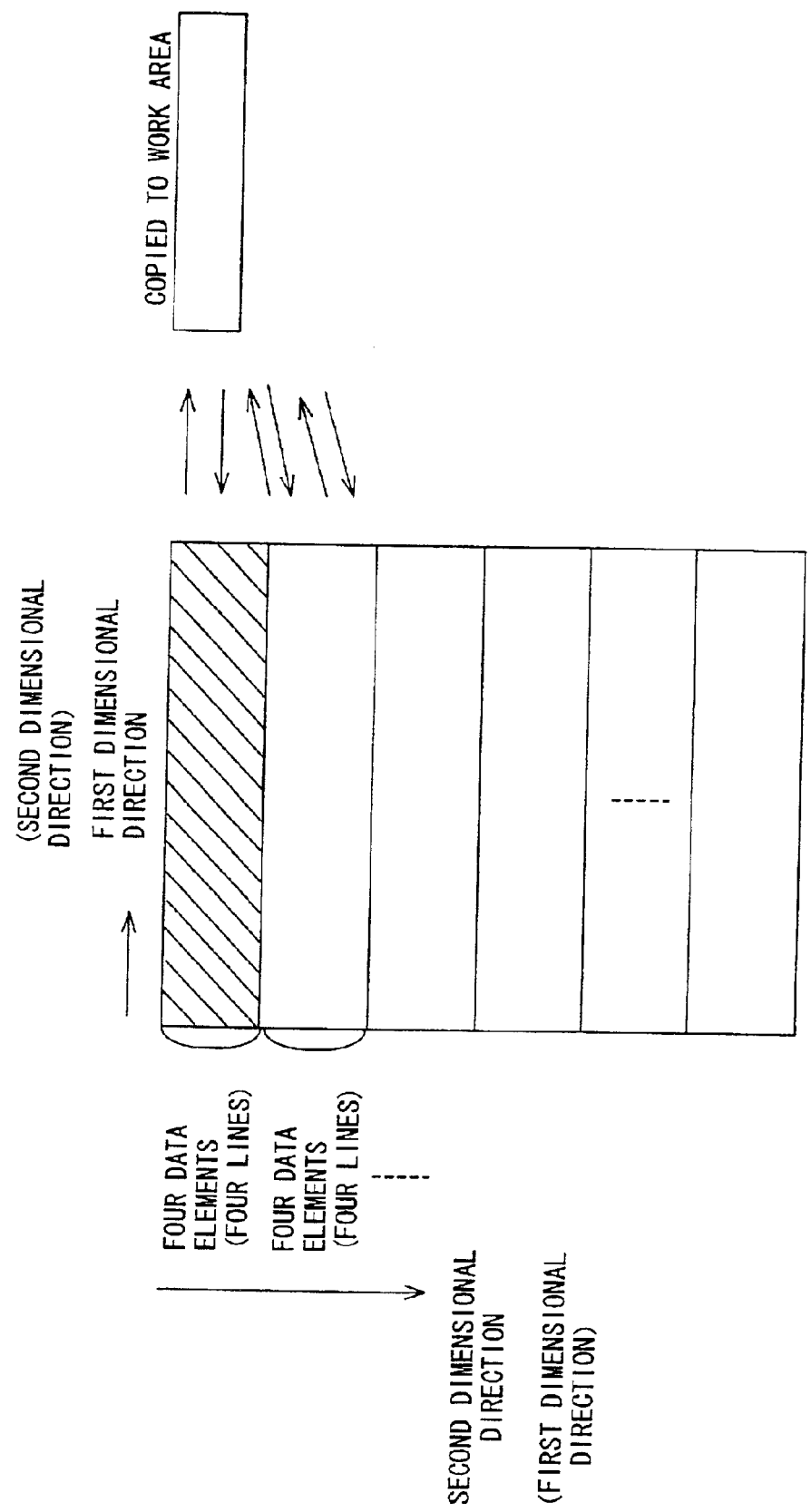
FIG. 4 is a schematic diagram for explaining the operation of the embodiment (No. 2)

FIG. 4 is a schematic diagram for explaining how each thread uses a work area in performing a two-dimensional Fourier transform.

When each thread performs a Fourier transform, the thread copies a plurality of data elements to the work area (L1 cache) and performs the calculation for the Fourier transform. Each thread repeats this process for all the data elements. Thereafter, each thread returns the results to successive addresses of the L2 cache. Referenced data or written data is left in the L2 cache.

This process is repeated for a Fourier transform in the row direction. Thereafter, a Fourier transform is performed in the column direction. At that point, 256×256 data elements can be accessed in the row direction. Thus, data in the L2 cache can be effectively reused.

Figure 5:
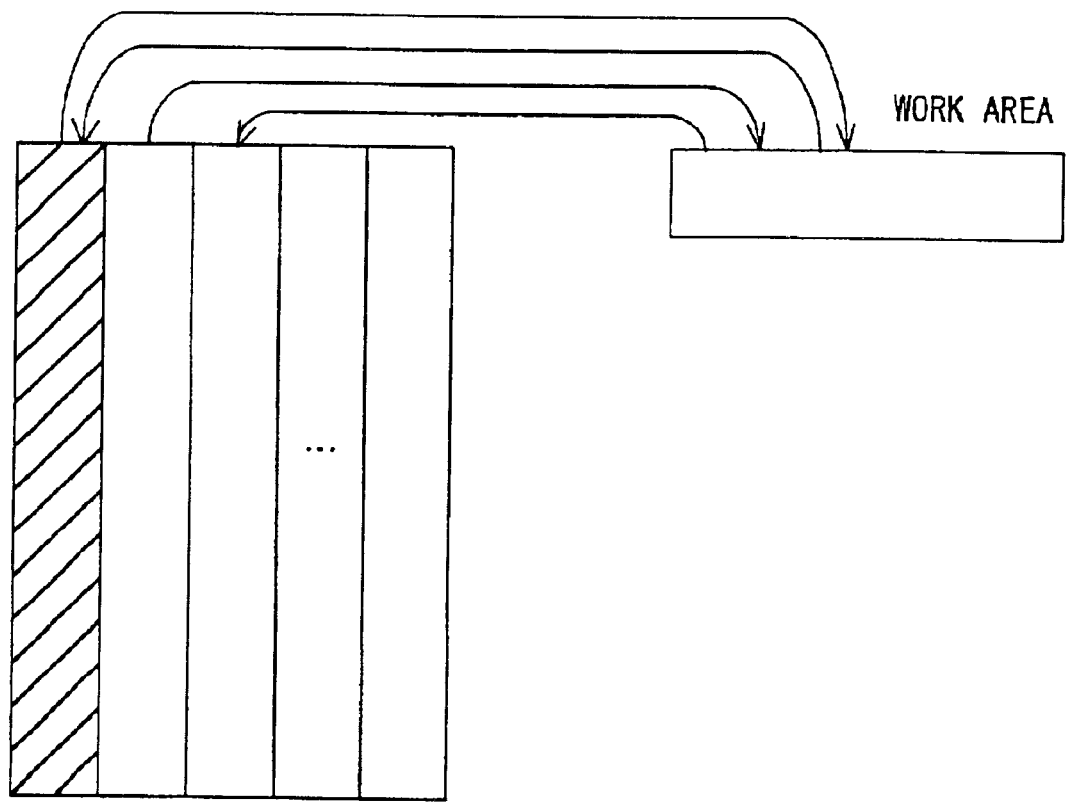
FIG. 5 is a schematic diagram for explaining the operation of the embodiment (No. 3)

FIG. 5 is a schematic diagram for explaining a process in the column direction.

The size of the work area (primary cache memory) may be the same as the size of a plurality of row vectors that are copied.

In other words, in the example shown in FIG. 4, every four elements of two-dimensional data are bound in the second dimensional direction and copied to a work area. With the work area, the process in the first dimensional direction is performed. After all the elements in the first dimensional direction have been processed, every four elements are bound in the first dimensional direction and copied to the work area. With the work area, elements are processed in the second dimensional direction.

The operation is repeated for the elements 1 to 64 in the third dimensional direction. Finally, each thread performs a Fourier transform for third dimensional data in parallel.

Figure 6:
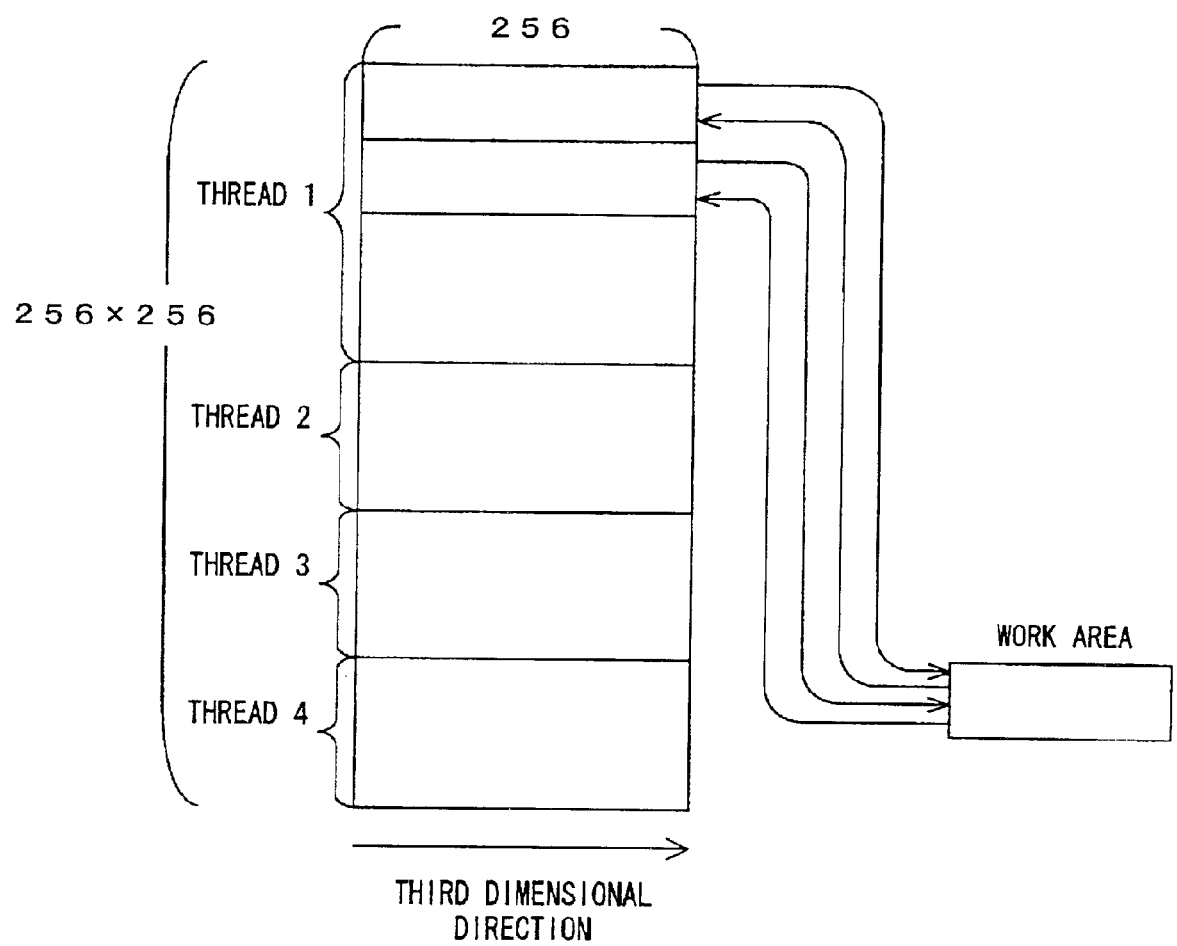
FIG. 6 is a schematic diagram for explaining the operation of the embodiment (No. 4)

FIG. 6 is a schematic diagram for explaining a Fourier transform in the third dimensional direction.

In other words, data that has been two-dimensionally transformed by the threads 1 to 4 is stored to a shared memory. Each thread copies assigned data from the shared memory to an L2 cache. Each processor performs a Fourier transform for the assigned data with the L2 cache.

At that point, although the L2 cache cannot be effectively used, since data is calculated with the L1 cache, several vectors are copied to the work area that has been used for the two-dimensional Fourier transform and then a Fourier transform is performed in the third dimensional direction.

Assuming that the storage capacity of a primary cache memory is 128 kb and the storage capacity of a secondary cache memory is 8 Mb, the number of vectors that are read to the work area is designated corresponding to the number of data elements performed for a Fourier transform in the following relation:

up to 256 elements: 13 vectors
up to 512 elements: 10 vectors
up to 1024 elements: 7 vectors
over 1024 elements: 3 vectors When a four-dimensional Fourier transform is performed, a two-dimensional Fourier transform is performed for first dimensional data and second dimensional data. Thereafter, a two-dimensional Fourier transform is performed for third dimensional data and fourth dimensional data. In the case of an even-order dimensional Fourier transform, a two-dimensional Fourier transform is repeated a required number of times. On the other hand, in the case of an odd-order dimensional Fourier transform, after a two-dimensional Fourier transform is repeated a predetermined number of times, a one-dimensional Fourier transform is performed. A method for such a process is apparent by those skilled in the art.

In the above-described embodiment, although the calculating method for the Fourier transform was not described, the method is known by those skilled in the art. Thus, those skilled in the art can easily accomplish the calculating method.

As is clear from the above description, the embodiment of the present invention is accomplished as an algorithm of a shared memory type scalar parallel computer. Alternatively, when the parallel computer is used as a dedicated Fourier computer, a program for the algorithm may be written to a ROM or the like. However, when the parallel computer is used as a general purpose computer, the algorithm of the embodiment of the present invention can be recorded as a program to a portable record medium such as a CD-ROM or a fixed record medium such as a hard disk. When necessary, the program can be loaded to the processor.

In such a case, the program that accomplishes the algorithm of the embodiment of the present invention can be distributed to a user through a portable record medium.

According to the present invention, a parallel multi-dimensional Fourier transform can be accomplished with high performance and high scalability.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A record medium for recording a program that causes an information apparatus to accomplish a multi-dimensional Fourier parallel processing method for a shared memory type scalar parallel computer having a plurality of processors, the method comprising:
   (a) dividing multi-dimensional data to be Fourier transformed into a plurality of two-dimensional data elements corresponding to the number of the processors and storing the divided two-dimensional data elements into secondary cache memories of the processors, the two-dimensional data consists of first and second dimensions of the multi-dimensional data, and storing the two-dimensional data elements into the secondary cache memory of the processors for two-dimensional data elements in turn until all the two-dimensional Fourier transforms in step (b) are finished;
   (b) causing each of the processors to two-dimensionally Fourier transform the two-dimensional data elements stored in the relevant secondary cache memory; and
   (c) when necessary to perform a Fourier transform of remaining dimensions of the multi-dimensional data assigning the remaining one-dimensional data elements to each of the processors and causing each of the processors to one-dimensionally Fourier transform the one-dimensional data elements.

2. The record medium as set forth in claim 1,
   wherein the step (b) is performed by causing each of the processors to bind a plurality of vectors of the secondary cache memory in a particular dimensional direction, copy the bound vectors to a relevant primary cache memory, and successively two-dimensionally Fourier transform the bound vectors.

3. The record medium as set forth in claim 1,
   wherein the multi-dimensional Fourier transform is a three-dimensional Fourier transform.

4. A multi-dimensional Fourier parallel processing method for a shared memory type scalar parallel computer having a plurality of processors, the method comprising:
   (a) dividing multi-dimensional data to be Fourier transformed into a plurality of two-dimensional data elements corresponding to the number of the processors and storing the divided two-dimensional data elements into secondary cache memories of the processors, the two-dimensional data consists of first and second dimensions of the multi-dimensional data, and storing the two-dimensional data elements into secondary cache memory of the processors for two-dimensional data elements in turn until all the two-dimensional Fourier transforms in step (b) are finished;

(b) causing each of the processors to two-dimensionally Fourier transform the two-dimensional data elements stored in the relevant secondary cache memory; and (c) when necessary to perform a Fourier transform of remaining dimensions of the multi-dimensional data assigning the remaining one-dimensional data elements to each of the processors and causing each of the processors to one-dimensionally Fourier transform the one-dimensional data elements.

5. A multi-dimensional Fourier parallel processing apparatus for a shared memory type scalar parallel computer having a plurality of processors, the apparatus comprising:

a dividing unit dividing multi-dimensional data to be Fourier transformed into a plurality of two-dimensional data elements corresponding to the number of the processors and storing the divided two-dimensional data elements to secondary cache memories of the processors;

a two-dimensional Fourier transform unit causing each of the processors to two-dimensionally Fourier transform the two-dimensional data elements stored in the relevant secondary cache memory until the Fourier transform of the two dimensional data elements is finished; and a one-dimensional Fourier transform unit repeating the two-dimensional Fourier transform a required number of times and when necessary by assigning remaining one-dimensional data elements of the multidimensional data to each of the processors and causing each of the processors to one-dimensionally Fourier transform the one-dimensional data elements.

6. A Fourier transform process for data having at least three dimensions, comprising:

dividing the data into processing thread groups along the third dimension with the number of thread groups corresponding to a number of processors;

performing, in cache memory of corresponding processors, a two dimensional Fourier transform of the data in each of the thread groups;

transferring transform results to shared memory; and performing, in the processors, a Fourier transform in the third dimension by accessing the results in the shared memory.

* * * * *

UNITED STATES PATENT AND TRADEMARK OFFICE
CERTIFICATE OF CORRECTION

| | |
|---|---|
| PATENT NO. | : 6,950,843 B2 |
| APPLICATION NO. | : 09/812829 |
| DATED | : September 27, 2005 |
| INVENTOR(S) | : Makoto Nakanishi |

It is certified that error appears in the above-identified patent and that said Letters Patent is hereby corrected as shown below:

On the cover page, (56) References Cited, U.S. Patent Documents, Column 2, line 4, delete " 2000/0358233".

Column 8, line 2, change "two dimensional' to --two-dimensional--

Column 8, line 7, change "multidimensional" to --multi-dimensional--

Column 8, line 17, change "two dimensional" to --two-dimensional--

Signed and Sealed this

Eighth Day of August, 2006

JON W. DUDAS
*Director of the United States Patent and Trademark Office*